United States Patent
Liu et al.

(10) Patent No.: US 9,756,170 B2
(45) Date of Patent: Sep. 5, 2017

(54) KEYWORD BASED MESSAGE HANDLING

(75) Inventors: Ying Fei Liu, Beijing (CN); Xiaohua Hou, Shanghai (CN)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1328 days.

(21) Appl. No.: 12/493,965

(22) Filed: Jun. 29, 2009

(65) Prior Publication Data
US 2010/0332218 A1    Dec. 30, 2010

(51) Int. Cl.
*H04M 1/725* (2006.01)
(52) U.S. Cl.
CPC .............................. *H04M 1/72552* (2013.01)
(58) Field of Classification Search
CPC .. H04L 12/581; H04L 51/04; H04M 1/72552; H04M 1/72547; G06F 17/2765; G06F 17/2705; G06F 17/211; G06F 17/30253

USPC .......................................................... 455/466
See application file for complete search history.

(56) References Cited

U.S. PATENT DOCUMENTS

| | | | |
|---|---|---|---|
| 8,140,632 B1* | 3/2012 | Jablokov et al. | 709/206 |
| 2004/0177064 A1* | 9/2004 | Satoh | 707/3 |
| 2005/0010641 A1* | 1/2005 | Staack | 709/206 |
| 2008/0126348 A1* | 5/2008 | Chisaka | 707/6 |
| 2010/0058200 A1* | 3/2010 | Jablokov et al. | 715/752 |
| 2010/0159883 A1* | 6/2010 | Pascal et al. | 455/412.1 |

* cited by examiner

*Primary Examiner* — Angela A Armstrong
(74) *Attorney, Agent, or Firm* — Core Wireless Licensing Ltd.

(57) ABSTRACT

An apparatus comprising a controller, wherein said controller is configured to display a message text, receive an input indicating a keyword; determine an associated operation and to generate a response message according to the associated operation.

19 Claims, 5 Drawing Sheets

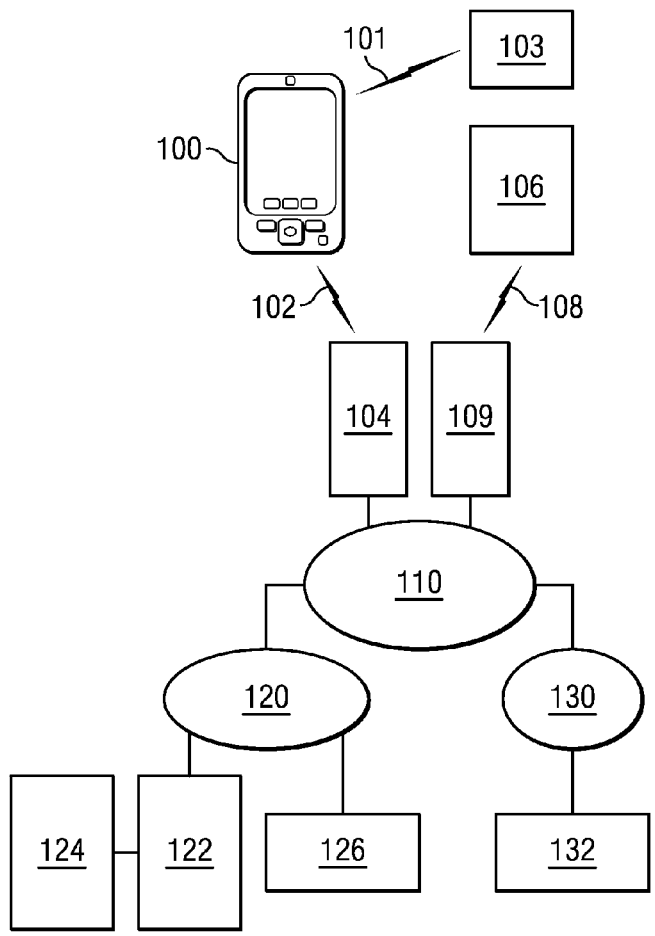
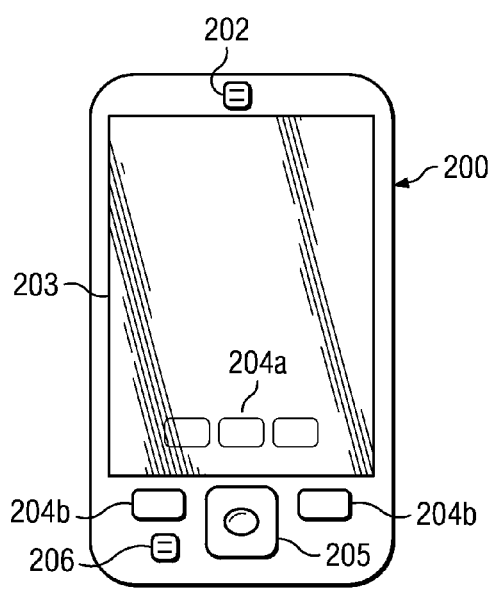
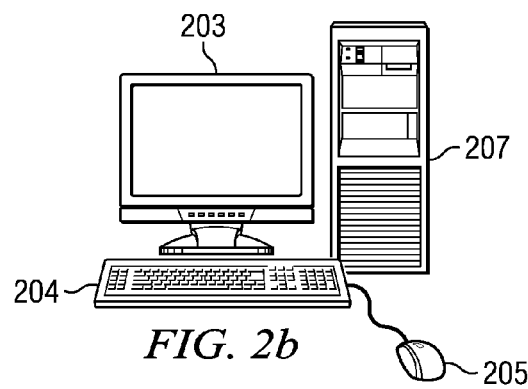
FIG. 1
FIG. 2a
FIG. 2b

KEYWORD BASED MESSAGE HANDLING

FIELD

The present application relates to a user interface, an apparatus, a computer readable medium and a method for improved message handling, and in particular to a user interface, an apparatus, a computer readable medium and a method for improved control of automatic replies to messages.

BACKGROUND

Contemporary apparatuses are equipped to send and receive messages in a number of different formats whether they be electronic mail messages, short text messages using a format, such as the Short Message Service (SMS) or Multi Media Service (MMS), or instant messages such as chat messages.

These services require a user to press a number of keys to reply even when the reply is relatively obvious from the message content. This can be annoying to a user and is also time consuming and tedious.

A more efficient way of replying to messages is thus needed.

An apparatus that allows easy and efficient replying to messages would thus be useful in modern day society.

SUMMARY

On this background, it would be advantageous to provide a user interface, an apparatus and a method that overcomes or at least reduces the drawbacks indicated above by providing an apparatus, a method, a computer readable medium and a user interface according to the claims.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIG. 1 is an overview of a telecommunications system in which a device according to the present application may be used according to an example embodiment, FIGS. 2a and b are views of each an apparatus according to an example embodiment.

DETAILED DESCRIPTION

Figure 3:
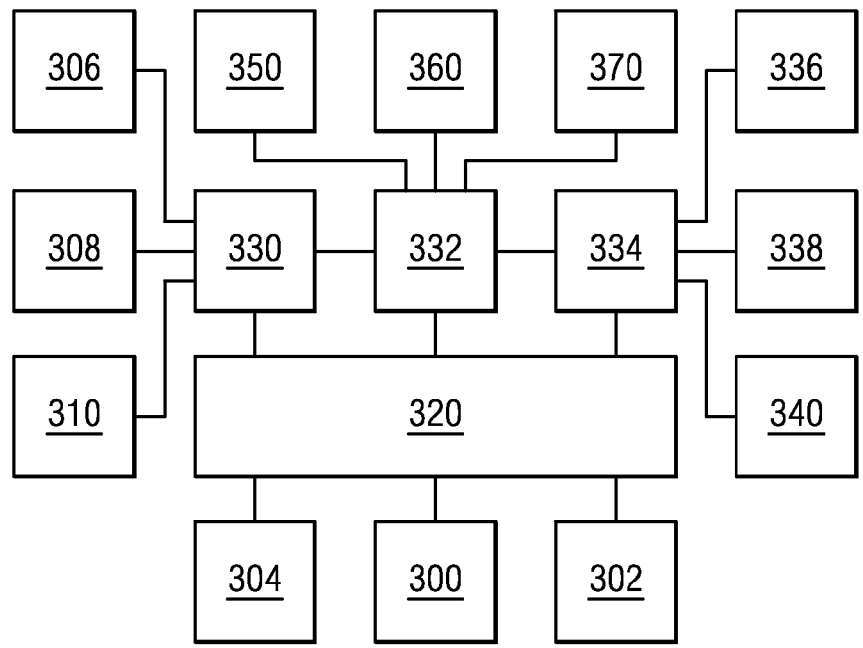
FIG. 3 is a block diagram illustrating the general architecture of an apparatus of FIG. 2 in accordance with the present application.

In the following detailed description, the user interface, the apparatus, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency (RF) links 102, 108 via base stations 104, 109. The mobile telecommunications network 110 may be in compliance with any commercially available mobile telecommunications standard, such as Group Spéciale Mobile (GSM), Universal Mobile Telecommunications System (UMTS), Digital Advanced Mobile Phone system (D-AMPS), The code division multiple access standards (CDMA and CDMA2000), Freedom Of Mobile Access (FOMA), and Time Division-Synchronous Code Division Multiple Access (TD-SCDMA).

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 as is commonly known by a skilled person. Various telephone terminals, including the stationary telephone 132, are connected to the PSTN 130. The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

A computer such as a palmtop can also be connected to the network both via a radio link such as a WiFi link, which is the popular term for a radio frequency connection using the WLAN (Wireless Local Area Network) standard IEEE 802.11.

It should be noted that the teachings of this application are also capable of being utilized in an internet network of which the telecommunications network described above may be a part of.

As is commonly known the internet is a global system of interconnected computer networks that interchange data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies.

The Internet carries various information resources and services, such as electronic mail, online chat, online gaming, file transfer and file sharing, and the inter-linked hypertext documents and other resources of the World Wide Web (WWW).

It should be noted that even though the teachings herein are described solely to wireless networks it is in no respect to be limited to wireless networks as such, but it to be understood to be usable in the Internet or similar networks. The teachings herein find use in any device having a touch input user interface where other input means, such as keyboards and joysticks, are limited. Examples of such devices are mobile phones, Personal digital Assistants (PDAs), game consoles, media players, personal organizers, electronic dictionaries and digital image viewers.

An embodiment 200 of the apparatus in the form of a mobile terminal 100, 200 is illustrated in more detail in FIG. 2a. The mobile terminal 200 comprise a main or first display 203 which in this embodiment is a touch display, a microphone 206, a loudspeaker 202 and a key pad 204 comprising both virtual keys 204a and softkeys or control keys 204b and 204c. The apparatus also comprises a navigation input key such as a five-way key 205.

Another embodiment of the apparatus 100 in the form of a computer 200 is illustrated in more detail in FIG. 2b.

The computer 200 has a display 203, a keypad 204 and a cabinet 207 in which a controller and a memory are housed. It should be noted that the cabinet 207 and the display 203 may be incorporated in the same unit. It should also be noted that the keypad 204 may also be integrated in the same unit as either the display 203 and/or the cabinet 207. The computer 200 also has a navigational input means which in this embodiment is a so-called mouse pointer 205. Other navigational input means such as touch pads or touch screens are also possible. It should be noted that the navigational input means may be incorporated into the same unit as the keypad 205, the cabinet, 207 and/or the display 203.

The computer 200 can be connected to a network as in FIG. 1 through either a direct dial-up connection, a Local Area Network connection (LAN) or through an internet connection.

Internet is a global network of interconnected computers, enabling users to share information along multiple channels. Typically, a computer that connects to the Internet can access information from a vast array of available servers and other computers by moving information from them to the computer's local memory. The same connection allows that computer to send information to servers on the network; that information is in turn accessed and potentially modified by a variety of other interconnected computers. A majority of widely accessible information on the Internet consists of inter-linked hypertext documents and other resources of the World Wide Web (WWW). Computer users typically manage sent and received information with web browsers; other software for users' interface with computer networks includes specialized programs for electronic mail, online chat, file transfer and file sharing.

The movement of information in the Internet is achieved via a system of interconnected computer networks that share data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies.

The internal component, software and protocol structure of the apparatus 200 will now be described with reference to FIG. 3. The apparatus has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM), Read Only Memory (ROM), Electrically Erasable Programmable Read-Only Memory (EEPROM), flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications such as a global positioning device (GPS) or other location finding device 340. The applications can include a message sending application 350, a a positioning application 360, as well as various other applications 370, such as applications for voice calling, video calling, sending and receiving messages such as Short Message Service (SMS), Multimedia Message Service (MMS) or email, web browsing, an instant messaging application, a phone book application, a calendar application, a control panel application, a camera application, one or more video games, etc. It should be noted that two or more of the applications listed above may be executed as the same application.

The MMI 334 also includes one or more hardware controllers, which together with the MMI drivers cooperate with the touch display 336/203, and the keypad 338/204 as well as various other Input/Output devices such as microphone, speaker, vibrator, ringtone generator, LED indicator, etc.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

The mobile terminal also has a Subscriber Identity Module (SIM) card 304 and an associated reader. As is commonly known, the SIM card 304 comprises a processor as well as local work and data memory.

FIG. 4 show a series of screen shot views 403 of an apparatus 400. It should be noted that such an apparatus is not limited to a mobile phone or a computer. In particular such an apparatus 400 is capable of receiving and sending messages.

In the following description it will be assumed that the display is a touch display and that a tap is performed with a stylus or finger or other touching means tapping on a position on the display. It should be noted that a tap may also be included by use of other pointing means such as a mouse or touch pad controlled cursor which is positioned at a specific position and then a clicking action is performed. This analogy is commonly known in the field and will be clear to a skilled person. In the description it will be assumed that a tap input comprises a clicking action at an indicated position.

Examples of such apparatuses are computers, media players, mobile phones, personal digital assistants (PDA) and game consoles.

The apparatus 400 comprises a touch display 403 on which an application window 410 is displayed. The size of the application window 410 is only an example and different application window sizes may be used as will be clear to a skilled person. A controller is configured to display information relating to an application in said application window 410 and to receive input relating to said application through said application window 410.

Figure 4A:
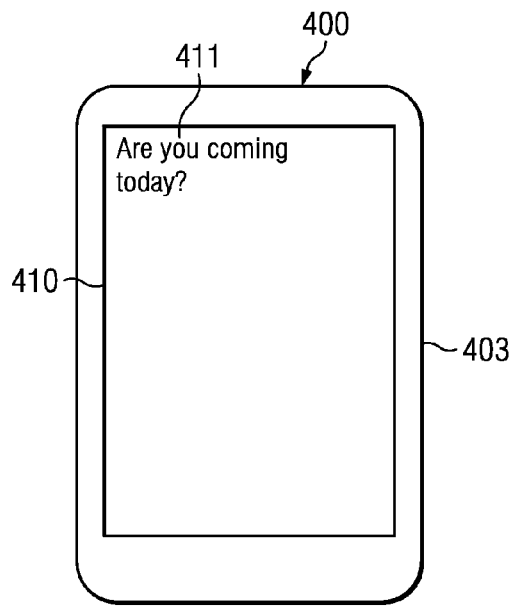
FIG. 4a to d are screen shot views of an apparatus according to an example embodiment, FIGS. 5a and b are flow charts each describing a method according to an example embodiment of the application.

The application window 410 is associated with a message application (350) and a message 411 "Are you coming today?" is displayed in the application window 410, see FIG. 4*a*.

A controller is configured to parse the message text 411 for keywords.

In one embodiment the keywords are associated with applications (350, 360, 370).

In one embodiment the controller is configured to combine at least two applications through a keyword wherein the keyword is associated with a semantic meaning or a causality.

In one embodiment the controller is configured to execute an operation according to the keyword and its association.

Table 1 shows a list of keywords divided into categories and the corresponding operations to be effected via the user interface.

Figure 4B:
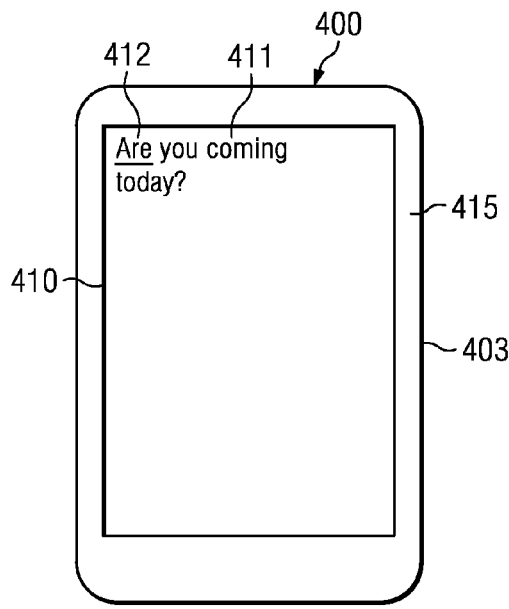
Figure 4C:
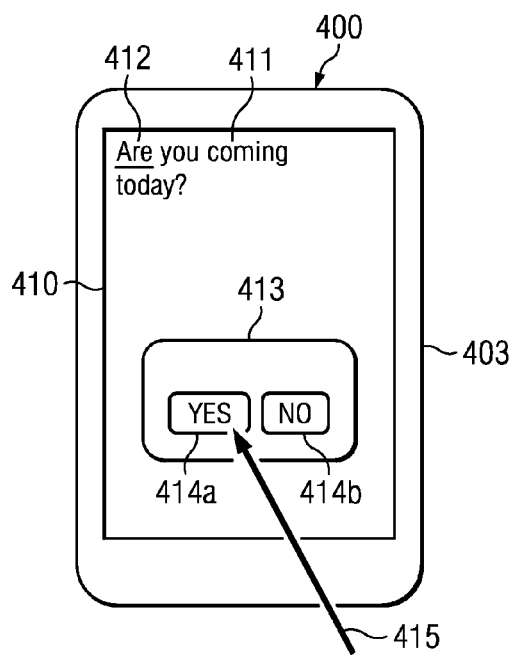

In FIG. 4*b* a controller has identified a keyword 412 which in this example reads "Are" which in this example is marked by being underlined. It should be clear that other methods of marking a keyword using for example highlighting, different colors, boxing in etc are part of the teachings herein.

The controller is configured to receive an input selecting a marked keyword.

In this embodiment the selection is achieved by a user tapping on the marked keyword.

One alternative is to allow a user to scroll to a wanted keyword and to select it by pressing a select key. In such an embodiment a double marking is used to show which are the keywords (one marking, for example underlining) and which keyword is currently marked for selection (a different marking, for example highlighting).

In one embodiment a controller is configured to receive a selection of a word and in response thereto parse collection of keywords to find a matching keyword and in response thereto perform an associated operation.

A controller is configured to, in response to receiving a selection of a keyword, identify the category of the keyword and perform the operation associated therewith.

In this example the category is QUESTION and the controller displays a dialogue window 413 giving the user a series of options 414 for how to reply to the question. In this example the two options given are to send a reply indicating "Yes" 414*a* or to send a reply indicating "No" 414*b*.

A controller is configured to receive an input selecting one of the displayed options 414 and to execute an operation accordingly.

In this example a user taps on the first option 414*a* using a stylus 415.

The controller performs the operation of generating a reply message 417 containing a response text 416 corresponding to the option 414 selected.

In one embodiment the controller is configured to send the generated message 417 automatically.

In one embodiment the controller is configured to launch a message editor application to allow for further editing of the generated message 417.

Figure 4D:
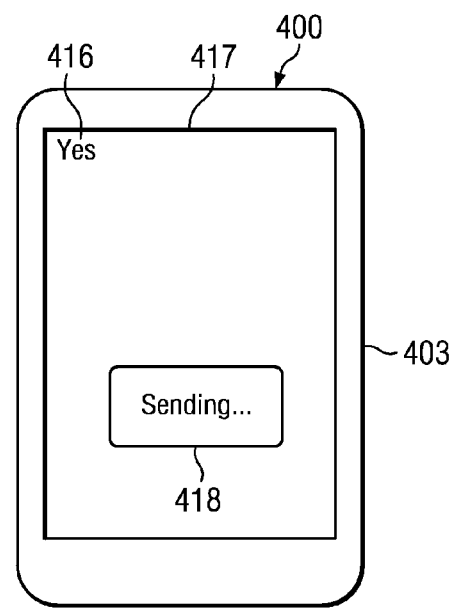

In FIG. 4*d* the controller has generated a response message 417 containing the response text "Yes" 416 and executed a send operation for the message.

In this example the controller is configured to display a notification 418 indicating what operation is being taken so that the user is able to maintain an overview of the apparatuses operation.

Figure 5A:
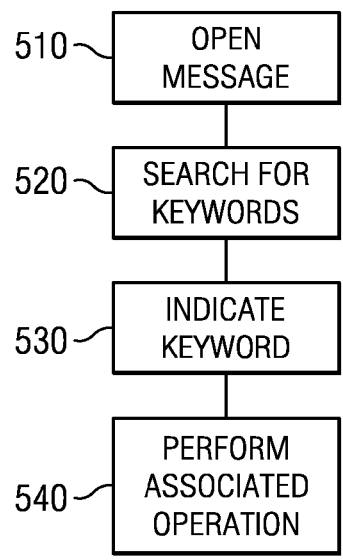

FIG. 5*a* shows a flowchart of a general method according to the described methods above. In block 510 a message is opened. In block 520 a controller searches for keywords. In one embodiment the controller parses the message for keywords. In block 530 a user indicates a keyword. In one embodiment the word is indicated or selected by being tapped on. In one embodiment a user first indicates a wanted keyword by selecting a word and the controller then searches a collection of databases for a matching keyword. In block 540 a controller performs an operation that is associated with the selected keyword.

Figure 5B:
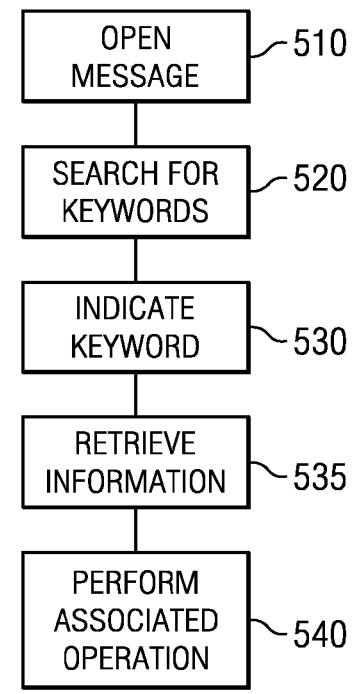

FIG. 5*b* shows a similar flowchart comprising a further block 535 where a controller is configured to retrieve information to use with the associated operation.

In one embodiment the processing of the keyword is performed locally. Thus a message text can be handled irrespective of its origin or format.

Furthermore as the two steps of finding a keyword and launching an associated application does not require any artificial intelligence or complicated algorithms the teachings herein are simple to execute requiring only a minimum of resources.

Furthermore a user is provided with a very intuitive manner of creating replies making sense and being adapted to the incoming text.

In one embodiment a controller is configured to display the main content of the message to be created at the same time as at least a portion of the message being replied to is displayed. See for example FIGS. 4*c*, 6*c* and 7*c* where a pop-up window is displayed as the dialogue box 413, 613, 713. This allows a user to simultaneously see both the message being replied to and the proposed reply which provides a user with a good and intuitive understanding of the operation of the apparatus. In one embodiment the controller is configured to display at least the portion of the message text 411, 611 which comprises the selected keyword. This provides a clear visual coupling of the keyword to the proposed response. See FIGS. 4*c*, and 7*c*.

FIG. 6 show a series of screen shot views 603 of an apparatus 600. It should be noted that such an apparatus is not limited to a mobile phone or a computer. In particular such an apparatus 600 is capable of receiving and sending messages.

In the following description it will be assumed that the display is a touch display and that a tap is performed with a stylus or finger or other touching means tapping on a position on the display. It should be noted that a tap may also be included by use of other pointing means such as a mouse or touch pad controlled cursor which is positioned at a specific position and then a clicking action is performed.

This analogy is commonly known in the field and will be clear to a skilled person. In the description it will be assumed that a tap input comprises a clicking action at an indicated position.

Examples of such apparatuses are computers, media players, mobile phones, personal digital assistants (PDA) and game consoles.

The apparatus 600 comprises a touch display 603 on which an application window 610 is displayed. The size of the application window 610 is only an example and different application window sizes may be used as will be clear to a skilled person. A controller is configured to display information relating to an application in said application window 610 and to receive input relating to said application through said application window 610.

Figure 6A:
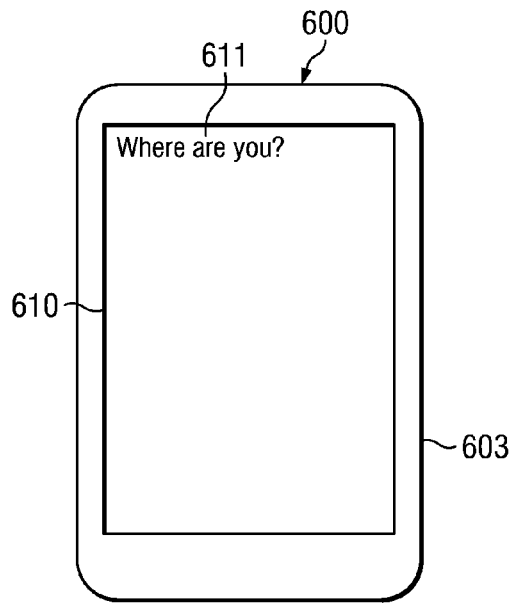
FIGS. 6a to d are screen shot views of an apparatus according to an example embodiment.

The application window 610 is associated with a message application (350) and a message 611 "Where are you?" is displayed in the application window 610, see FIG. 6*a*.

A controller is configured to parse the message text 611 for keywords.

Figure 6B:
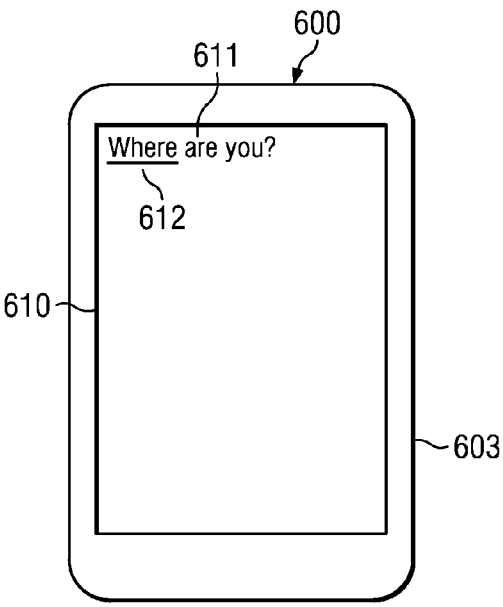

In FIG. 6*b* a controller has identified a keyword 612 which in this example reads "Where" which in this example is marked by being underlined. It should be clear that other methods of marking a keyword using for example highlighting, different colors, boxing in etc are part of the teachings herein.

The controller is configured to receive an input selecting a marked keyword 612.

In this embodiment the selection is achieved by a user tapping on the marked keyword. As has been described with reference to FIG. 4 several alternatives of how to indicate a keyword exist.

A controller is configured to, in response to receiving a selection of a keyword, identify the category of the keyword and perform the operation associated therewith.

In one embodiment the controller is configured to retrieve information corresponding to the associated operation.

In this example the category is LOCATION and the controller is configured to retrieve information corresponding to the associated operation, which in this example is a location which is retrieved from a location finding device such as an internal (or external) GPS device (340).

Figure 6C:
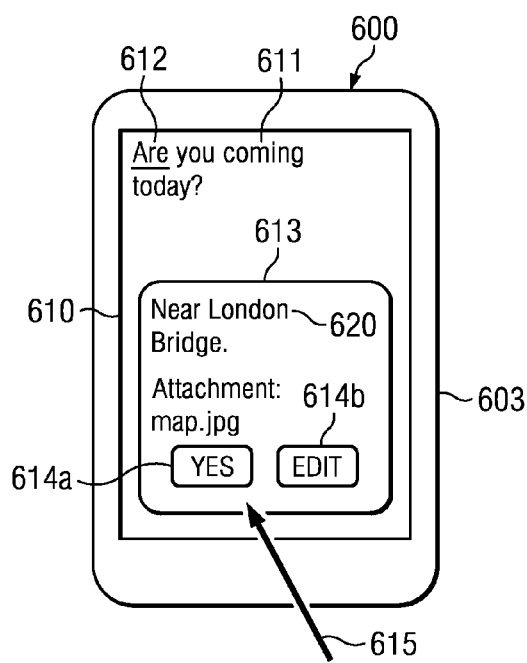

In FIG. 6*c* a controller displays a dialogue window 613 giving the user an option 614 for how to reply to the message 611. In this example the options given are whether to reply 614*a* using a location 619 retrieved from the GPS device (340) or to edit 614*b* the response first. In one embodiment, such as in this example, the controller is also configured to provide an explanatory text 620 for the location 619.

A controller is configured to receive an input selecting one of the displayed options 614 and to execute an operation accordingly.

In this example a user taps on the first option 614*a* using a stylus 615.

The controller performs the operation of generating a reply message 617 containing a response text 616 corresponding to the option 614 selected. In this example the response text 616 is generated to be the same as the explanatory text 620. In one embodiment the response text 616 includes the explanatory text 620 and other text making the response text 616 more fluent or coherent with the context.

Figure 6D:
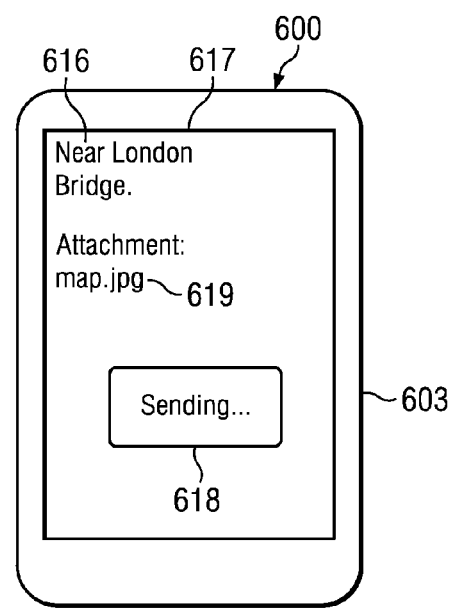

In one embodiment the controller is configured to attach the retrieved information 619 to the generated text, see FIG. 6*d*.

In FIG. 6*d* the controller has generated a response message 617 containing a response text "Near London Bridge" 616 and the retrieved information 619 in the form of an attachment and executed a send operation for the message. In this example the attachment is an image file representing a map. In one example the attachment is included in the response text 616.

In one embodiment a controller is configured to receive input indicating a second keyword. In one embodiment a controller is configured to perform an operation associated with both keywords. In one embodiment a controller is configured to perform an operation associated with the first keyword using the second keyword as data. In one embodiment a controller is configured to perform an operation associated with the second keyword using the first keyword as data.

FIG. 7 show a series of screen shot views 703 of an apparatus 700. It should be noted that such an apparatus is not limited to a mobile phone or a computer. In particular such an apparatus 700 is capable of receiving and sending messages.

In the following description it will be assumed that the display is a touch display and that a tap is performed with a stylus or finger or other touching means tapping on a position on the display. It should be noted that a tap may also be included by use of other pointing means such as a mouse or touch pad controlled cursor which is positioned at a specific position and then a clicking action is performed. This analogy is commonly known in the field and will be clear to a skilled person. In the description it will be assumed that a tap input comprises a clicking action at an indicated position.

Examples of such apparatuses are computers, media players, mobile phones, personal digital assistants (PDA) and game consoles.

The apparatus 700 comprises a touch display 703 on which an application window 710 is displayed. The size of the application window 710 is only an example and different application window sizes may be used as will be clear to a skilled person. A controller is configured to display information relating to an application in said application window 710 and to receive input relating to said application through said application window 710.

Figure 7A:
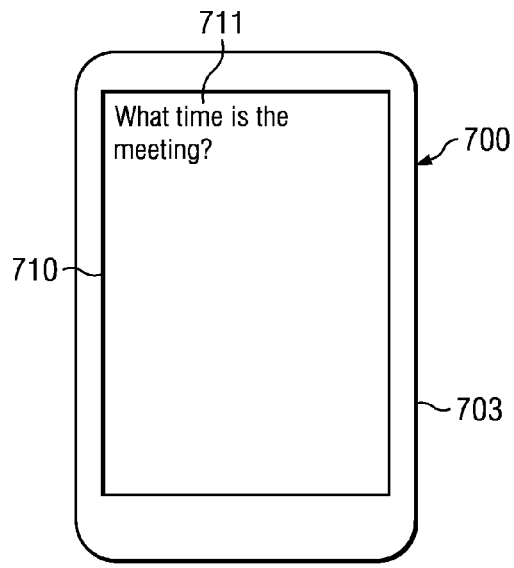
FIGS. 7a to d are screen shot views of an apparatus according to an example embodiment.

The application window 710 is associated with a message application (350) and a message 711 "What time is the meeting?" is displayed in the application window 710, see FIG. 7*a*.

A controller is configured to parse the message text 711 for keywords.

Figure 7B:
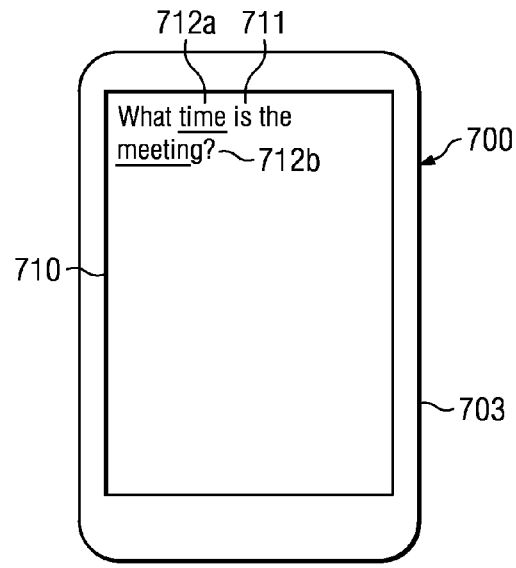

In FIG. 7*b* a controller has identified a first keyword 712*a* which in this example reads "time" which in this example is marked by being underlined. It should be clear that other methods of marking a keyword using for example highlighting, different colors, boxing in etc are part of the teachings herein.

In this example the controller has identified a second keyword 712*b* which in this example is "meeting" which is also displayed as being marked.

The controller is configured to receive an input selecting a marked keyword 712*a*.

The controller is further configured to receive an input indicating a second keyword 712*b*.

In this embodiment the selection is achieved by a user tapping on the marked keyword. As has been described with reference to FIG. 4 several alternatives of how to indicate a keyword exist.

A controller is configured to, in response to receiving a selection of a keyword, identify the category of the keyword and perform the operation associated therewith.

In one embodiment the controller is further configured to pair a first keyword with a second keyword.

In this example the category of the first keyword is TIME and the controller is configured to retrieve information corresponding to the associated operation, which in this example is to open a calendar application.

In one embodiment the associated operation is to open a clock application.

In one embodiment the controller is configured to receive input indicating a date and/or time in the calendar or clock view 713. The user may thus select a date and/or time by tapping on it in the calendar or clock view 713. A controller is configured to display the dates, times or calendar entries as selectable options 714.

In one embodiment a controller is configured to search for the second keyword 712*b* in the opened application.

In one embodiment, where the second keyword corresponds to a meeting, a controller is configured to search for a meeting which includes the sender of the message 711 as a participant.

In one embodiment a controller is configured to search for the second keyword in the opened application using a text comparison search. This enables the controller to find a calendar entry corresponding to a selected keyword being used as data. For example, if the text 711 is "What time do we play chess" (keywords underlined) the controller opens the calendar application as this is associated with "time" and then searches for an entry containing the second keyword "chess".

Figure 7C:
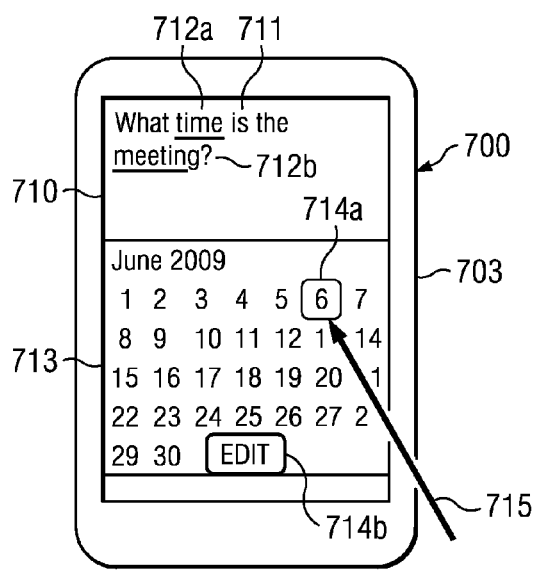

In FIG. 7*c* a controller displays a dialogue window 713 presenting a calendar view. One date is marked in the calendar view for selection being a first option 714*a* for how to reply to the message 711. In this example the options given are whether to reply 714*a* using a time and date 719 retrieved from the calendar application or to edit 714*b* the response first.

In one embodiment the marked date 714*a* corresponds to the found meeting.

In one embodiment, such as in this example, the controller is also configured to provide an explanatory text 720 for the time and date 719.

A controller is configured to receive an input selecting one of the displayed options 714 and to execute an operation accordingly.

In this example a user taps on the first option 714*a* using a stylus 715.

The controller performs the operation of generating a reply message 717 containing a response text 716 corresponding to the option 714 selected. In this example the response text 716 is generated to be the same as the explanatory text 720 combined with the time and date 719.

Figure 7D:
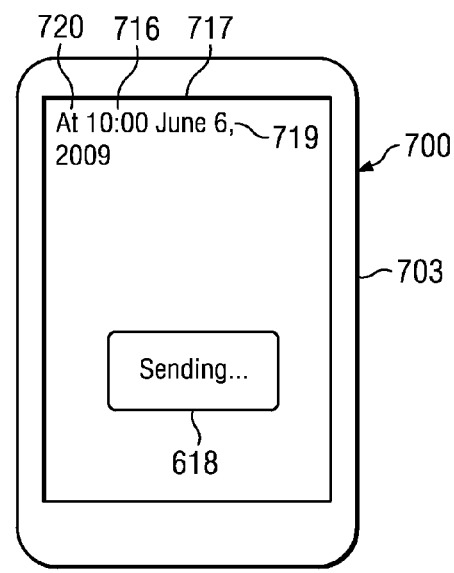

In FIG. 7*d* the controller has generated a response message 717 containing a response text "At 10:00 Jun. 6, 2009" 716. In this example the explanatory text 720 is "At".

In one embodiment according to all of the exemplary apparatuses above a controller is configured to receive a user selection of keywords and is configured to not search the text for keywords. In such an embodiment block 530 is executed before block 520. In block 530 a user indicates a keyword by selecting a word in the text. In block 520 a controller searches a collection of keywords to find one matching the selected word and from that finding an associated operation.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal Digital Assistants (PDAs), game consoles, media players, personal organizers, electronic dictionaries, computers or any other device designed for receiving and sending messages.

Examples of computer-readable medium are data storage mediums such as Compact Disks (CD), Digital Video disks (DVD), Random Access Memory (RAM), Read Only Memory (ROM), hard drives and other disks such as USB disks (Universal Serial Bus).

The teaching of the present application has numerous advantages. Different embodiments or implementations may yield one or more of the following advantages. It should be noted that this is not an exhaustive list and there may be other advantages which are not described herein. For example, one advantage of the teaching of this application is that a message may he replied to in a fast and efficient manner which requires little learning or understanding of the underlying system. It also does not require any extensive modification to a system and is easy to use between different messaging systems requiring little standardization if any as the processing is performed locally in an apparatus and is not part of the message sent.

Although the teaching of the present application has been described in detail for purpose of illustration, it is understood that such detail is solely for that purpose, and variations can be made therein by those skilled in the art without departing from the scope of the teaching of this application.

For example, it should be appreciated that the teachings of the present application may also be applied to various types of electronic devices, such as mobile phones, media players, palmtop computers, laptop computers, desktop computers, workstations, mainframe computers, game consoles and so on. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

TABLE 1

| Category | Keyword | UI operations |
|---|---|---|
| Time | when, time, date | Open calendar or clock |
| Location | Where, position, location | Get location from GPS application |
| Question | Whether, if, yes or no | A dialog with "yes" and "no" selection. |
| Special Term | Company Name, famous people's name | Get the related info in details, like location, how to reach there, etc |
| Public Info | Weather, traffic info, ticket price | Get the info like the weather, the price etc |

TABLE 1-continued

| Category | Keyword | UI operations |
|---|---|---|
| Some short sentences which are frequently used | For example: How are you? | A dialog with "fine" and "not good" selection |

What is claimed is:

1. An apparatus comprising:
a wireless communications interface;
a man-machine interface; and
a controller, coupled to the wireless communications interface and the man-machine interface, and programmably configured to:
cause display of message text in a message received via the wireless communications interface;
receive an input via the man-machine interface indicating a first keyword in the displayed message text;
indentify a category associated with the first keyword, the identified category being one of a plurality of categories of keywords, each category associated with an operation and with at least one keyword;
perform the operation associated with the identified category to generate a response message including information corresponding to the first keyword; and
cause sending of the response message via the wireless communications interface.

2. An apparatus according to claim 1, wherein said controller is further configured to perform the operation by:
causing display of a dialogue window presenting at least one option;
receiving input indicating an option; and
generating said response message according to the indicated option.

3. An apparatus according to claim 2, wherein said controller is further configured to display said dialogue window optionally partially overlapping said message text while not overlapping said keyword.

4. An apparatus according to claim 1, wherein said controller is further configured to:
receive an input via the man-machine interface indicating a second keyword in the displayed message text, and
perform the operation associated with the identified category by;
generating the response message including information corresponding to said first keyword and said second keyword.

5. An apparatus according to claim 4, wherein said controller is further configured to perform said operation by
opening an application associated with the first keyword and
retrieving information from the opened application using the second keyword as data.

6. An apparatus according to claim 1, wherein said operation is at least one of opening an application and retrieving information from an application.

7. An apparatus according to claim 6, wherein said controller is further configured to generate said response message so that it comprises said retrieved information.

8. An apparatus according to claim 1, wherein said controller is further configured to
parse the message text to find keywords and
to display these found keywords as marked and to receive said input indicating at least one of said found and marked keywords.

9. An apparatus according to claim 1, wherein the association of the at least one keyword, with a category is based on a semantic meaning of the keyword.

10. A non-transitory computer readable medium comprising at least computer program code that, when executed by a processor in an apparatus, causes the apparatus to perform a plurality of operations comprising:
displaying message text in a message received at the apparatus over a communications network;
receiving an input indicating a keyword of the displayed message text;
identifying a category associated with the indicated keyword, the identified category being one of a plurality of categories of keywords, each category associated with a user interface (UI) operation and with at least one keyword;
performing the UI operation associated with the indentified category to generate a response message including information corresponding to the indicated keyword; and
sending the response message over the communications network.

11. A method comprising:
displaying message text in a message received at an apparatus over a communications network;
receiving an input at the apparatus indicating a first keyword of the displayed message text;
identifying, by a controller in the apparatus, a category associated with the first keyword, the identified category being one of a plurality of categories of keywords, each category associated with an operation and with at least one keyword; and
performing the operation associated with the identified category to generate a response message including information corresponding to the first keyword; and
transmitting the response message from the apparatus over the communications network.

12. A method according to claim 11 wherein the step of performing the operation associated with the identified category comprises:
displaying a dialogue window presenting at least one option;
receiving input indicating an option; and
generating said response message according to the indicated option.

13. A method according to claim 12 wherein the step of performing the operation displays said dialogue window at least partially overlapping said message text while not overlapping said keyword.

14. A method according to claim 11 further comprising:
receiving input indicating a second keyword in the displayed message text;
wherein the step of performing the operation generates a response message including information corresponding to said first keyword and said second keyword.

15. A method according to claim 14 wherein the step of performing the operation associated with the indentified category comprises:
opening an application associated with the first keyword and
retrieving information from the application using the second keyword as data.

16. A method according to claim 11 wherein said operation is at least one of opening an application and retrieving information from an application.

17. A method according to claim 16 further comprising generating said response message so that it comprises said retrieved information.

18. A method according to claim 11 further comprising:
   parsing the message text to find keywords;
   displaying these found keywords as marked and
   receiving said input indicating at least one of said found and marked keywords.

19. A method according to claim 11, wherein the association of the at least one keyword with a category is based on a semantic meaning of the keyword.

\* \* \* \* \*